3,608,288
TRACTOR WITH A FLOTATIONALLY MOUNTED MOWER
Sherman C. Heth and Vernon R. Kaufman, Racine, Wis., assignors to Jacobsen Manufacturing Company, Racine, Wis.
Filed Apr. 23, 1970, Ser. No. 31,223
Int. Cl. A01d *35/26*
U.S. Cl. 56—15.8                                                6 Claims

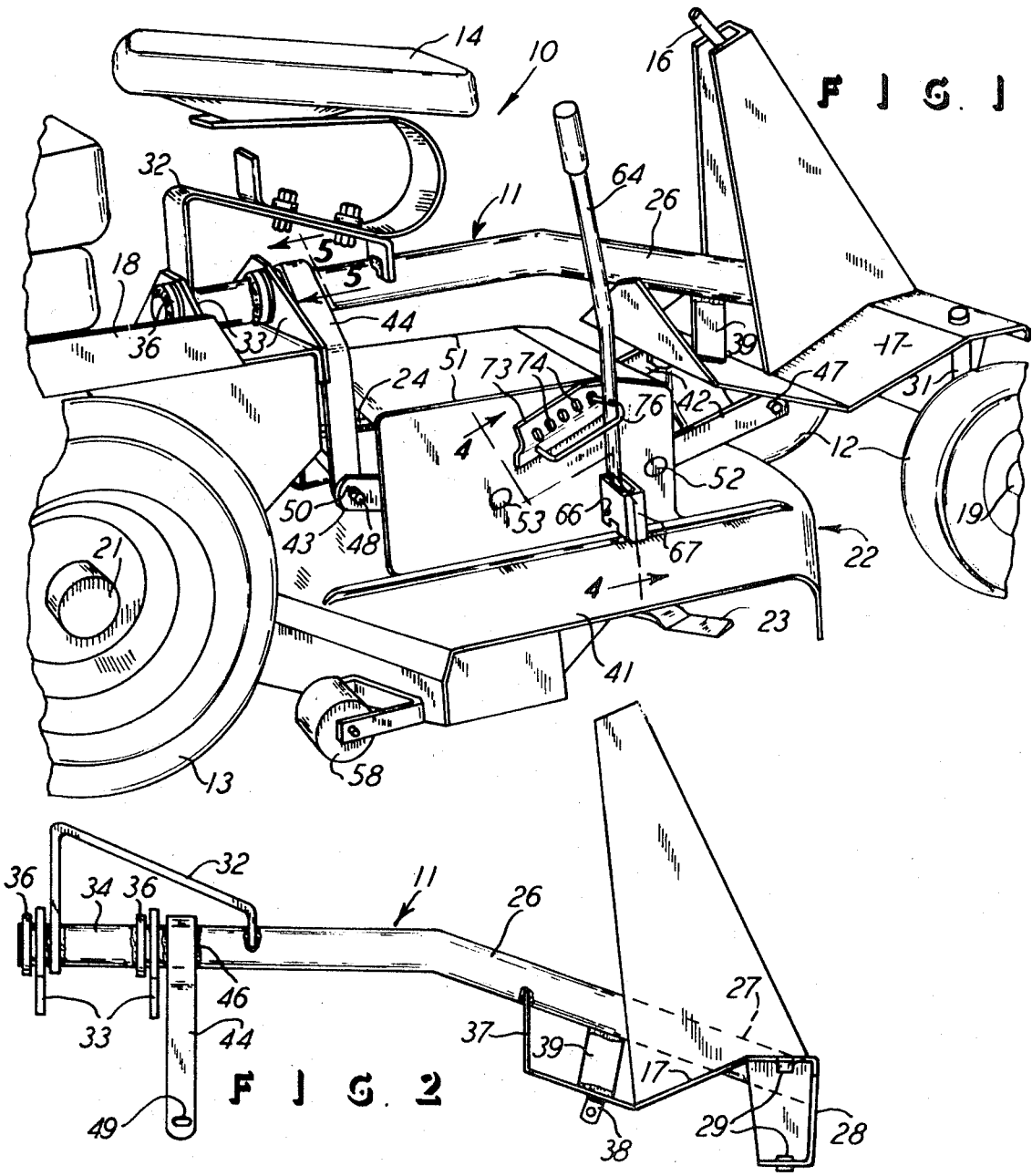

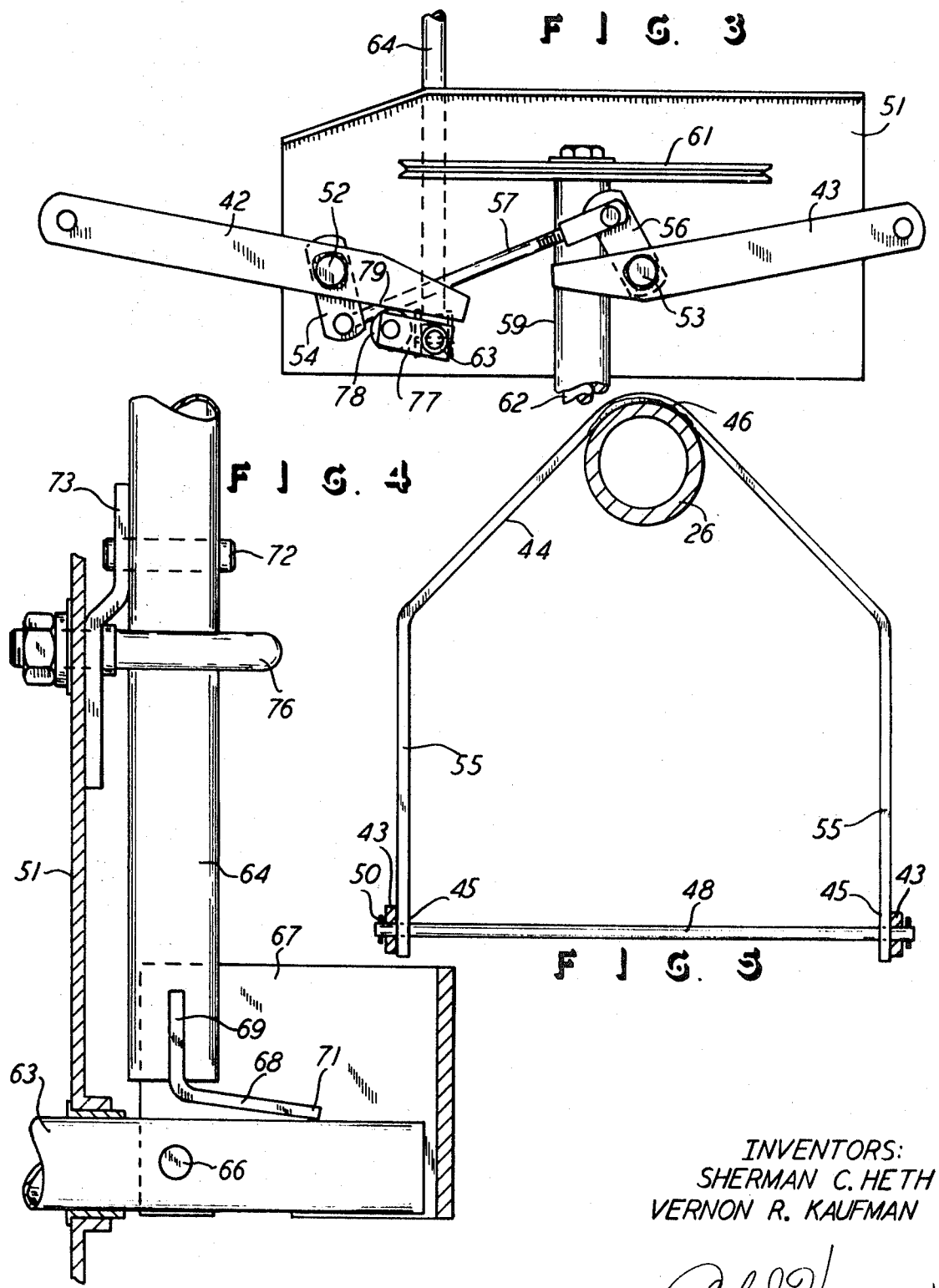

ABSTRACT OF THE DISCLOSURE

Tractor with a flotationally mounted mower and with the tractor having a frame piece and a front axle assembly and a rear axle assembly with a traction unit. The front axle and rear axle are pivotal relative to each other and in the plane transverse to the fore-and-aft direction of the tractor, by virtue of the tractor frame piece being pivotal relative to the traction unit and rear axle assembly. A rotary type lawn mower is suspended below the tractor frame piece, and the mower floats so that it can move up and down relative to vertically adjusted positions and relative to irregularities in the ground being traversed by the tractor. Rigid type link members suspend the mower from the frame piece, and a pair of links extends forwardly of the mower for the suspension, and a pair of links extends rearwardly of the mower for the suspension. Also, a yoke is affixed to the frame piece and connects to the pair of rearwardly extending link members so that the yoke pivots in the transverse plane along with the pivot of the frame piece and thereby positively positions the mower transverse of the fore-and-aft direction and in response to the mower meeting rises in the ground being traversed. Adjusting mechanism is connected to the mower support links so that the mower can be adjustably raised and lowered in selected set positions. Also, ground engaging wheels are provided on the mower for engaging the ground, depending upon relative height of the mower to the ground.

---

This invention relates to a tractor with a flotationally mounted mower. More specifically, it relates to a tractor with a mower suspended beneath the tractor in a position to be vertically adjustably disposed and in a manner such that the power will float or move up and down in response to meeting rises in the ground being traversed, and the mower will also tilt or pivot laterally of the mower fore-and-aft direction, in response to the tractor front wheels meeting rises or depressions in the ground being traversed.

BACKGROUND OF THE INVENTION

The prior art is already aware of tractors with a flotationally mounted mower suspended beneath the tractor. Such mowers are supported from the tractor to either continuously ride on the ground by means of ground wheels or skids, or to be suspended slightly above the ground. Where the mower is suspended above the ground, the connections for suspending the mower are commonly arranged so that the mower will rise up if it engages a rise in the ground being traversed. In this respect, the mower is considered to be a floating mower, and the lowest position of the mower is set by the suspension members, but the mower is also free to move upwardly in the event it encounters a rise in the ground. Still further, the prior art is aware of mower-supporting tractors wherein the front axle assembly will tilt or pivot in a plane transverse to the fore-and-aft direction of tractor movement, and such tilting action is produced by one of the tractor front wheels encountering either a rise or a depression in the ground. Of course it is common practice and desirable to have the tractor front wheels maintain contact with the ground, even though a rise or depression is encountered by one of the front wheels. In the prior art constructions, when one of the front wheels meets a rise or depression in the ground, the tractor is commonly arranged so that the floating mower will also tilt in a manner comparable to the tilt of the front wheel axle or assembly, so the mower will also be positioned relative to the rise or depression in the ground. Prior art examples of flotationally supported rotary mowers are found in U.S. Pats. 2,576,886 and 2,949,004. Prior art examples of tractors with tiltable front axles, relative to the rear axles, are found in U.S. Pats. 2,924,928 and 2,972,850. The prior art also is aware of, and holds many examples of structures where the mower is suspended beneath the tractor and off the ground for at least most of the mowing action, and with the tractor having the tiltable front axle for similar tilting of the mower, and one such example is found in U.S. Pat. 3,154,903.

The purpose of these structures of tractors with flotationally suspended mowers is to have the mower responsive to the irregularities in the ground surface, and it is therefore desirable to tilt the mower laterally of the fore-and-aft tractor direction, so that the mower aligns with the ground being traversed. That is, the mower lateral tilt is commonly induced by providing a tiltable front axle and by connecting the tiltable front axle to the mower so that the two tilt together. In doing this, the mower is connected to the tractor or the front axle assembly by means of links, so that the tilting of the front axle can be accurately impressed upon the mower, at the front of the mower. However, the rear of the mower is most commonly suspended by means which do not positively or firmly impress the front axle tilt upon the rear portion of the mower.

Therefore, there is a concern and a problem with regard to supporting the mower so that it is flotational relative to the tractor and so that the mower is also positively and completely tilted laterally, along with the tilt of the front axle. In the prior art, where the mowers are connected to the front axle to tilt therewith, the rear portions of the mowers are frequently supported on the ground by rollers or the like, and such mowers are therefore subjected to constant vibration induced by the use of small rollers or wheels responding to the irregularities in the ground. Further, the ground supported mowers are not vertically adjustable in their cutting heights, unless the ground supporting wheels themselves were to be made vertically adjustable, perhaps similar to that shown in U.S. Pat. 2,972,850.

Where the mower is not provided with ground rollers or wheels or skids for substantially constant contact with the ground, there is a problem in supporting the rear portion of the mower so that it can respond to the tilt of the front axle. The problem includes the consideration of avoiding excessive strain on the mounting of the mower at the front portion of the mower, so that the front of the mower does not have to take the entire load of tiltably supporting the mower, including the rear portion. That is, the front supporting links should not be required to transmit the full force necessary to tilt the mower in precise relationship to the tilt of the front axle, since such arrangement places excessive strain on the links supporting the front of the mower. Flexible suspension means, such as cables or chains, are not suitable for full support of the rear of the mower so that the front supporting links are not subjected to undue strain in tilting the mower.

Accordingly, it is an object of this invention to provide an improved structure of a tractor with a flotationally supported mower. More especially, it is an object of this invention to provide a tractor with a mower suspended from the tractor in a manner wherein the tractor front axle tilts relative to the rear axle and the suspension mechanism is arranged to transmit the tilting force to the mower but to do so without unduly binding or restraining the flotationally supporting suspension members.

A more specifically claimed object of this invention is to provide a tractor with a flotationally suspended mower and wherein the tractor front axle tilts relative to the rear axle and the mower has suspension members of a rigid link type which permit the mower to float up and down and which also connect to both the front portion and the rear portion of the mower to positively tilt both portions of the mower in the same degree that the front axle is tilted. In accomplishing this object, the rigid link members connected to the rear portion of the mower are provided with laterally spaced apart connection points which are positively displaced along with the tilt of the front axle so that the positive displacement is transmitted to the mower and therefore the mower is also positively displaced and positively held in the tilted position so that the full force of mower tilting is not carried by the front link members only, but the tilting force is carried quite equally by both the front and rear link members connecting to the mower.

Still another object of this invention is to provide an improved tractor with flotationally suspended mower, and wherein the mower has vertical adjusting means which are an improvement over those heretofore known and which provide for ready, easy, and accurate setting of the selected vertical position of the mower relative to the tractor, and with the adjusting means being simplified and forming a part of the suspension means.

BRIEF DESCRIPTION OF THE DRAWINGS

FIG. 1 is a right side perspective view of a preferred embodiment of this invention and showing parts fragmentarily.

FIG. 2 is a right side elevational view of the tractor frame piece shown in FIG. 1.

FIG. 3 is a side elevational view of a portion of the suspension means and mower shown in FIG. 1, and with the view being taken from the left side of the mower shown in FIG. 1.

FIG. 4 is an enlarged sectional view taken substantially along the lines 4—4 of FIG. 1.

FIG. 5 is an enlarged sectional view taken along the line 5—5 of FIG. 1.

DETAILED DESCRIPTION OF THE PREFERRED EMBODIMENT

A tractor, generally designated 10, is shown to have a frame piece, generally designated 11, and a pair of front ground and steerable wheels 12 and a pair of rear ground and traction wheels, such as the shown wheel 13. An operator's seat 14, a steering column 16, operator's foot rest 17, and a rear traction portion 18 are also seen in FIG. 1. A front wheel axle 19 and a rear wheel axle 21 are part of the front and rear wheel axle assemblies, respectively, and these assemblies are connected to the tractor frame piece 11 in any conventional manner. FIG. 1 also shows a mower, generally designated 22, flotationally suspended on the tractor 10. It will of course be seen that the mower is shown to be a rotary type of lawn mower having a rotational blade 23 and being driven by the prime mover (not shown) of the tractor by means of the commonly arranged drive belt 24 extending between the traction portion 18 and the mower 22, in conventional and well-known arrangements. Thus the cutting blade 23 is rotated in a horizontal plane, and the rotation is of course powered by the prime mover of the tractor and the drive connection between the tractor and the mower 22 is by virtue of the commonly used belt 24, with the belt 24 being arranged so that the mower 22 can tilt and move up and down and the drive to the blade 23 is not interrupted or impeded in the movement of the mower 22 relative to the tractor 10, all in a conventional manner and as will be readily understood by one skilled in the art.

FIG. 2 shows the mower frame piece 11, and the piece includes a pipe member 26 which has its longitudinal extent being in the direction of the fore-and-aft direction of movement of the tractor 10. The pipe front end 27 is fixedly secured with the portion 28 of the frame piece 11. Front axle support portions 29 are provided on the front portion 28, and they rotatably receive the front axle upstanding portion 31 seen in FIG. 1. In this arrangement, the tractor front wheels 12 are therefore fixed relative to the elevation or any tilt of the tractor frame front portion 28. The tractor frame 11 also is shown to carry the seat support member 32 and the mounting plates 33 which rotatably receive the rear end 34 of the pipe member 26. It will also be understood that the two spaced-apart plates 33 are suitably secured to the traction portion 18 of the tractor 10, but the pipe 26 is rotatable in the plates 33, and thus the pivotal or tiltable action of the pipe 26 and therefore the front axle assembly of the tractor is achieved by the relationship of the pipe 26 with the support plates 33.

Stop collars 36 are shown welded to the pipe 26, to restrict the pipe 26 relative to the plates 33, and thereby complete the assembly of the frame piece 11 with the traction portion 18. Also, the frame piece 11 has a depending panel portion 37 which is welded to the pipe 26 and which carries a pair of depending ears 38, as shown between FIGS. 1 and 2. A reinforcing piece 39 is also welded between the pipe 26 and the panel 37. Of course it will be understood that the pipe front portion 27 carrying the panel 37 and carrying the frame piece front portion 28 are all rigidly secured together as one integral piece, preferably by appropriatte welding.

With the arrangement described, the front axle is laterally pivotable or tiltable relative to the rear axle, as the traction portion 18 is pivotal on the frame piece 11. The front wheels 12 are the steering wheels, and the rear wheels 13 are the traction wheels, all arranged in the conventional manner and as readily understood by one skilled in the art.

Rigid link members are shown to be connected between the tractor frame piece 11 and the mower housing 41. These link members include the front pair of links 42 and the rear pair of links 43. Also included in the link members is the yoke 44 which is shown welded to the frame piece 11 at 46. It will therefore be understood that the yoke 44 has two spaced-apart portions or legs 55 and has connection points or locations 45 at the lower ends of the legs 55. Further, the yoke 44, being rigidly secured to the frame piece 11, pivots in the plane of the yoke 44, along with the pivot or rotation of the member 11 in its connection with the traction portion 18. Thus, the yoke 44 positively and firmly transmits to the rear links 43 the force from the pivot action of the front axle or frame piece 11 to thereby positively tilt and laterally displace the mower 22, along with the positive tilting and lateral displacement of the mower 22 by means of the front links 42 which are connected to the frame piece 11 at the spaced-apart ears 38 and through the connecting pins 47. Also, the yoke connecting points or locations 45 are connected to the rear links 43 through the rod 48 which extends between the links 43 and through openings therein and through the slotted openings 49 on the lower ends of the legs 55 of the yoke 44. The shown cotter pins 50 extending through the ends of the rod 48 secure the assembly mentioned, and, the yoke 44 is therefore provided in sufficient strength and connection to transmit the full pivotal action of the frame piece 11 to the links 43, as desired.

FIGS. 1 and 3 show that the mower side panels 51 rotatably receive and support shafts 52 and 53 which respectively connect to front links 42 and rear links 43. Further, arms 54 and 56 are also respectively fixedly secured to the shafts 52 and 53 for rotation therewith.

An adjustable connector rod 57 extends between the ends of the arms 54 and 56 to transmit the identical rotation between the shafts 52 and 53.

In this manner, the rigid link members described flotationally support the mower 22 from the tractor frame piece 11. It will therefore be understood that the mower 22 is suspended from the tractor 10 either without touching the ground or the mower can be in ground contact, in which instance, the mower has rear rollers, such as the shown roller 58, rotatably mounted on the mower housing 41 for engaging the ground and keeping the housing 41 off the ground. Also, if the mower 22 were to engage a rise in the ground, the mower would simply pivot upwardly, by virtue of the rigid link members described, as the link members pivot on the pins 47, rod 48, and shafts 52 and 53.

FIG. 3 also shows that the mower has a cutter shaft housing 59, and a pulley 61 is disposed at the upper end of the housing 59 and connects to the shaft 62 which extends down to the rotary cutter 23. The belt 24 is trained on the pulley 61, but, regardless of the elevation or tilt of the mower 22, the belt drive is maintained between the traction unit 18 and the pulley 61, so flotational and pivotal or tiltable action is possible in the mower 22, all the while that the mower is being operated in rotation of the cutter blade 23.

FIGS. 1, 3, and 4 also show an elevation-adjusting mechanism for selectively vertically positioning the mower 22 relative to the tractor 10. Here again, the suspension members are employed for this purpose, and the suspension members therefore serve a double purpose of the transmitting of the positive force of tilting and the positive upwardly supporting of the mower by the adjusting mechanism to be described.

The adjusting mechanism includes a rotatably mounted shaft 63 which is rotatable in the mower side panels 51, as thus seen in FIG. 4. An adjusting arm 64 is pivoted on the shaft 63 through the interconnecting pin 66 and the U-shaped connector member 67. Thus the lower end of the adjusting arm or lever 64 is preferably welded to the member 67, and the member 67 then has the pin 66 extending into the member 67. A spring 68 has an end 69 affixed to the lower end of the lever 64, and the spring end 71 is in abutment with the shaft 63. With the spring 68, the lever 64 is yieldingly urged inwardly toward the mower side panels 51 for a latching purpose to be described.

Lever 64 has a pin 72 which extends toward an index plate 73 suitably affixed to the mower side panel 51. A series of openings 74 exist in the plate 73 for separate and individual reception of the latching pin 72 on the lever 64. It will therefore be understood that the lever 64 pivots about the pin 66 to move away from the index plate 73 and thereby withdraw the pin 72 from one of the holes 74. The withdrawn lever 64 can then be moved in a direction parallel to the mower side panel 51, and, in such movement, the shaft 63 is rotated about its own axis, and the lever pin 72 can then be reinserted in one of the selected holes 74. In this manner, the shaft 63 is set in a selected rotated position, and such position establishes the elevation of the mower 22 relative to the tractor 10, in a manner described later. A guard 76 extends around the laterally outside portion of the lever 64 so that the lever 64 can be withdrawn from the index plate 73 but it will not be pivoted to a position where it would be damaged or where it would not be convenient for reinserting the pin 72 into one of the holes 74 without tedious attention and motion.

FIG. 3 shows an arm 77 which is affixed to the shaft 63 to rotate therewith. A roller 78 is rotatably mounted on the extending end of the arm 77, and the roller abuts the lower surface 79 of the link 42. Therefore, the rotation of the shaft 63 is transmitted to one of the links 42 by virtue of the abutment of the roller 78. The link 42 therefore rotates the shaft 52 which in turn rotates the other link 42 affixed to the end of the shaft 52. Also, the rotating shaft 52 rotates the arm 54, and it therefore rotates the arm 56 through the adjustable connector 57, and the shaft 53 is then rotated, and finally the other pair of links 43 is rotated. In this manner, both pairs of links 42 and 43 are similarly rotated so that both the front and rear portions of the mower are raised or lowered equally, as desired.

In distinction over the prior art, it is therefore seen that the mower 22 is fully suspended from the rotatable frame piece 11 only. Further, it is seen that the mower 22 is under positive and full control of the frame piece 11, so the mower will tilt precisely as the frame piece 11 is tilted. Still further, the slots 49 in the yoke spaced-apart legs 55 permit the action described, but they in no way detract from the full floating action of the mower and from the positive lateral displacement or tilt of the mower. Also, the adjustable elevation mechanism described permits the mower to move upwardly without disturbing the adjusting lever 64 or the shaft 63, and the surface 79 of the link or member 42 would simply move upwardly away from the set roller 78, in the event the mower encountered a rise in the ground, for instance.

What is claimed is:

1. A tractor with a flotationally mounted mower, said tractor having a frame piece extending in the fore-and-aft direction of tractor movement, a front wheel axle and a rear wheel axle respectively attached to said frame piece at the opposite forwardly and rearwardly extending ends of said frame piece, steerable ground wheels mounted on said front wheel axle and traction ground wheels mounted on said rear wheel axle, said front wheel axle being fixedly attached to said frame piece at points laterally spaced relative to the fore-and-aft direction of tractor movement, and said rear wheel axle being pivotally attached to said frame piece for pivotal motion about an axis extending in the fore-and-aft direction of said tractor and relative to said frame piece and said front wheel axle, suspension members connected between said mower and said tractor at front and rear locations on said mower for flotationally suspending said mower under said frame piece, the improvement comprising, said suspension members being rigid link members pivotally connected to said tractor only at points on said frame piece for transmitting the full pivot of said front axle and said frame piece to said mower at both said front and rear locations on said mower.

2. The tractor with a flotationally mounted mower as claimed in claim 1, wherein one member of said rigid link members is fixedly secured to said frame piece and is connected to said rear location on said mower for pivotal motion with said frame piece and thereby positively forcing said mower laterally relative to the fore-and-aft direction of said tractor in following relation to the pivotal motion of said front axle relative to said rear axle.

3. The tractor with a flotationally mounted mower as claimed in claim 2, wherein said one member is a yoke having connector points spaced apart laterally relative to said fore-and-aft direction on opposite sides of a vertical plane through the longitudinal extent of said frame piece, some of the remainder of said rigid link members being pivotally connected to said yoke at said connector points for laterally pivotal motion along with that of said yoke, and said some of said link members being pivotally connected to said yoke at said connector points for up-and-down movement of said mower relative to said yoke and said frame piece.

4. The tractor with a flotationally mounted mower as claimed in claim 3, wherein said yoke is U-shaped and inverted to extend downwardly from said frame piece, and the pivotal connection between said yoke and said some of said link members being a self-adjusting connection extending in the fore-and-aft direction of said tractor to provide freedom for the up-and-down movement of said mower.

5. The tractor with a flotationally mounted mower as claimed in claim 1, wherein said link members include two pairs of links pivotally connected to said mower, one of said pair of links extending forwardly from said mower and the other of said pair of links extending rearwardly from said mower, the links of each of said pairs of links being spaced apart with the links of each of said pairs being on opposing sides of said mower, and wherein said link members include a member fixedly secured to said frame piece and having two spaced-apart connnection points on laterally opposite sides of said frame piece and with said connection points being respectively pivotally connected to said pair of links extending rearwardly on said mower, and including an adjusting means operatively connected to said link members for pivoting said link members on said mower for raising and lowering said mower on said frame piece.

6. The tractor with a flotationally mounted mower as claimed in claim 5, wherein said adjusting means includes an index member for releasably latching said adjusting means in a selected position, and said adjusting means includes a spring for yieldingly urging said adjusting means toward a latched position on said index member.

References Cited
UNITED STATES PATENTS 3,154,903  11/1964  Smith _____ 56—15.8

LOUIS G. MANCENE, Primary Examiner

J. A. OLIFF, Assistant Examiner